United States Patent [19]
Elliott

[11] Patent Number: 4,836,240
[45] Date of Patent: Jun. 6, 1989

[54] PILOT-ASSISTED PRESSURE RELIEF VALVE

[75] Inventor: Daniel J. Elliott, Delavan, Wis.

[73] Assignee: Webster Electric Company, Inc., Racine, Wis.

[21] Appl. No.: 175,922

[22] Filed: Mar. 31, 1988

[51] Int. Cl.⁴ .............................................. F16K 17/18
[52] U.S. Cl. ..................... 137/493; 91/420; 137/454.5; 137/495; 137/508
[58] Field of Search ............... 91/420; 137/454.5, 493, 137/495, 508

[56] References Cited
U.S. PATENT DOCUMENTS

| | | | |
|---|---|---|---|
| 3,054,420 | 9/1962 | Williams | 137/508 X |
| 3,595,264 | 7/1971 | Martin | 137/493 |
| 3,665,810 | 5/1972 | Parrett | 91/420 |
| 4,336,826 | 6/1982 | Grawunde | 137/540 |
| 4,346,733 | 8/1982 | Grawunde | 137/493 |

Primary Examiner—Gerald A. Michalsky
Attorney, Agent, or Firm—Peter N. Jansson, Ltd.

[57] ABSTRACT

An improved compact pilot-assisted pressure relief valve is disclosed. The invention includes a vent piston or the like hydraulically dividing the valve body bore into a hydraulic fluid chamber and a spring chamber which is vented to atmosphere, such that backpressure is eliminated entirely for both faster reaction to pressure impulses and improved accuracy in pre-load setting of the valve assembly.

7 Claims, 1 Drawing Sheet

PILOT-ASSISTED PRESSURE RELIEF VALVE

FIELD OF THE INVENTION

This invention is related generally to flow control valves and, more particularly, to pilot-assisted pressure relief valves.

BACKGROUND OF THE INVENTION

Pilot-assisted pressure relief valves, often called overcenter or holding valves, are used to control fluid flow to and from an actuator and to hydraulically lock the actuator in position when fluid flow is terminated. The valve prevents load-induced "runaway" and provides a static overload relief function Some of such valves have also included a check valve which allows flow to proceed unimpeded from the source to the actuator, but prevents fluid flow from the actuator to the source.

One common application for valves of this type is the control of fluid flow to an actuator used for operating a boom assembly. In order to raise the boom assembly, fluid is directed to the boom actuator via the check valve section of the pilot-assisted relief valve. As soon as flow terminates, the check valve operates to prevent return fluid flow from the actuator to the source and in this way the load is locked in position.

Examples of such pilot-assisted pressure relief valves include the valves disclosed in U.S. Pat. Nos. 4,336,826 and 4,346,733, which are assigned to the assignee of the instant invention.

Valves of this general type include a valve body defining an internal bore that slidably supports an elongate piston. A spring-loaded valve seat is mounted at one end of the valve body bore and is engagable with the piston. The piston and valve seat cooperate to control fluid flow between axially-spaced sets of radial ports which are formed in the valve body.

A portion of the end of the piston which engages the valve seat is exposed to fluid pressure present in one set of ports. Such pressure develops a force on the piston which urges it toward an open position, away from the valve seat. An adjustable principal spring which is at the opposite end of the valve body opposes this fluid force and maintains piston closure until the fluid force exceeds the spring force. Thus, adjustment of the spring determines the relief setting of the valve. Should an excessively high or overload pressure be encountered, the piston will move from its valve seat and allow fluid flow to the source until the pressure is reduced below the relief setting.

Such pressure relief valves have a pilot-assist feature to exert a force, on a pilot pressure area, in opposition to the principal spring. Such pilot-assist may be in various forms. Regardless of its exact form, the pilot-assist allows application of a pilot pressure from a pilot pressure passage formed in the valve body. The applied pilot pressure exerts a force on the principal piston in opposition to the spring force.

By selectively applying the pilot pressure to the pilot pressure area, controlled opening of the valve can be achieved to allow fluid flow from the actuator to the source, and thus effect lowering of the boom assembly. If the pilot pressure flow is terminated, the piston will immediately reclose and prevent further flow from the actuator. Should the load begin to "run away," the principal piston will throttle or terminate the flow due to the reduced force on the effective pressure area defined on the valve engaging end of the piston While pilot-assisted pressure control valves of the type described have been generally acceptable for a variety of tasks, there are a number of problems and shortcomings the solution of which has led to this invention.

In particular, in some cases oil pressure in the valve body in the space around the spring has caused backpressure causing specific problems. For one thing, because of such backpressure the main piston is sometimes too slow in its reaction to pressure impulses The result is a slower-than-desirable relief of pressure Such backpressure also makes accurate setting of threshold pressures difficult or impossible. Prior pilot-assisted pressure relief valve designs did not allow solution of such problems in a simple manner, particularly in a valve of very compact construction.

OBJECTS OF THE INVENTION

It is an object of this invention to provide an improved pilot-assisted pressure relief valve overcoming some of the problems and shortcomings of devices of the prior art, including those mentioned above.

Another object of this invention is to provide a pilot-assisted pressure relief valve of compact and simple construction which eliminates backpressure problems.

Another object of this invention is to provide a compact pilot-assisted pressure relief valve which reacts quickly to pressure impulses.

Another object of this invention is to provide a compact pilot-assisted pressure relief valve the threshold pressure of which may readily be adjusted accurately, without the problems and inaccuracies caused by backpressure.

These and other important objects will be apparent from the following descriptions.

SUMMARY OF THE INVENTION

This invention provides an improved pilot-assisted pressure relief valve overcoming certain problems of prior devices, including those mentioned above. Backpressure and backpressure problems are eliminated in a compact valve design which allows the improved valve to fit in certain compact installations. The improved valve is quick in its reaction to pressure impulses. Its threshold pressure can readily be set with good accuracy.

This improved pilot-assisted pressure relief valve is of the type having: a valve body with an axial bore, first and second axially-spaced radial ports, and a pilot port; a valve seat at one end thereof; a tubular piston in the valve body slidable with respect to the valve seat to control fluid flow from the first radial port into the piston, the piston having a first end engagable with the valve seat, an opposite second end, an effective pressure area at the first end exposed to pressure at the first radial port which urges the piston away from the valve seat, a piston port adjacent to the second radial port, and an external shoulder adjacent to the pilot port such that pilot pressure urges the piston away from the valve seat; and a spring extending between the valve body and the piston second end to urge the piston toward engagement with the valve seat.

In its broadest form, the improvement of this invention involves the inclusion of means adjacent to the second end and the spring to hydraulically divide the valve body bore into a hydraulic fluid chamber and a spring chamber which is vented to atmosphere. In this way, without adding size and length to the valve structure backpressure is eliminated entirely. The result is both faster reaction to pressure impulses and improved accuracy in pre-load setting in a compact valve assembly.

In highly preferred embodiments, the hydraulic dividing means comprises a vent piston which is slidably engaged with respect to the tubular piston, actually inside such tubular piston, with hydraulic seal means between such pistons. The tubular piston preferably has an annular wall which forms an axial opening at the second end of the tubular piston, and the vent piston has a head which is received within the annular wall, with the seal means located between the head and the annular wall.

Such vent piston preferably has an elongated portion which is received within the coil spring. More specifically, the tubular piston and its annular wall terminate in a distal edge of the annular wall, such distal edge being engaged by one end of the spring. The spring is a coil spring engaged at one end with the distal edge. The elongated portion of the vent piston extends from the head away from the tubular piston, with the coil spring extending around the elongated portion.

An annular adjustment screw is preferably threadedly engaged to an inside wall of the valve body and receives both the other end of the coil spring and the elongated portion of the vent piston. Such annular adjustment screw has an end wall, and the elongated portion of the vent piston has a distal end which engages the end wall. This not only defines an end point of axial movement of the tubular piston, but serves to limit the range of threshold pressure adjustment. An end cap having a filter vent is preferably attached to the annular adjustment screw.

At the other end of the valve, it is preferred that the valve seat be spring biased toward engagement with the aforementioned first end of the tubular piston and fluid-depressible away from such engagement, as in certain prior valves. As with such prior valves, this allows the valve seat to function as a check valve.

In preferred embodiments, the hydraulic seal means, that is, the aforementioned seal between the tubular piston and the vent piston is an annular seal having a diameter equal to the diameter of the location of engagement between the tubular piston and the valve seat. This arrangement provides a hydraulically-balanced tubular piston.

DETAILED DESCRIPTIONS OF PREFERRED EMBODIMENTS

The Figues illustrate the overall construction of a pilot-assisted pressure relief valve embodying the present invention. The valve shown is constructed in a cartridge configuration but the invention is adaptable to non-cartridge type valves.

Figure 1:
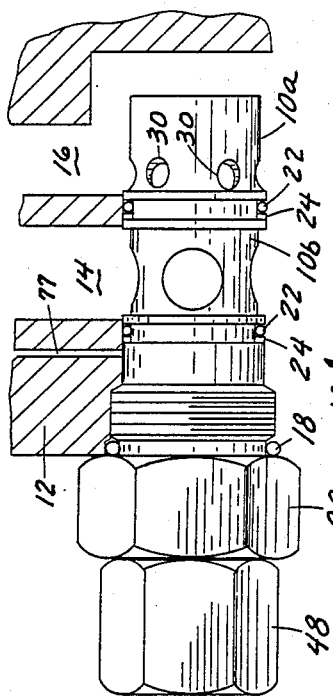
FIG. 1 is a side elevation of a pilot-assisted pressure relief valve constructed in accordance with a preferred embodiment of the invention.

The valve includes an elongate valve body 10 adapted to threadably mount into a manifold or housing 12 (shown in FIG. 1) and when mounted extends between a pair of flow passages 14,16. An O-ring seal 18 prevents fluid leakage between valve body 10 and housing 12. Valve body 10 has a hexagonal portion 20 shaped for engagement by a wrench to facilitate install and tightening. A pair of O-rings 22 and associated teflon backup rings 24 are disposed in spaced grooves 26 on valve body 10. O-rings 22 sealingly engage housing 12 to seal off fluid communication between two adjacent sections 10a, 10b of valve body 10. Valve body section 10a communicates with flow passage 16 and includes a plurality of radial ports 30. Valve body section 10b communicates with flow passage 14 and includes a plurality of radial ports 32.

Fluid communication between passages 14 and 16 is controlled by an elongated tubular piston 34 and by an associated valve seat 36 at a first end of tubular piston 34. Tubular piston 34 and valve seat 36 are disposed in a flow path between ports 30,32.

Figure 2:
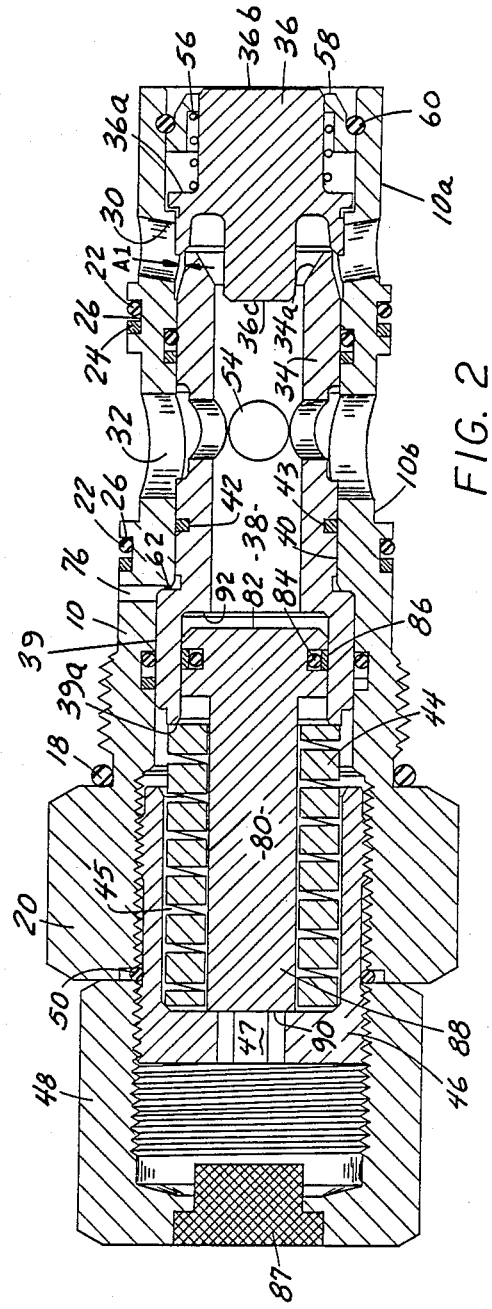
FIG. 2 is an enlarged cross-sectional view of the valve illustrated in FIG. 1.

As seen in FIG. 2, piston 34 is an elongate tubular structure having a substantially uniform piston bore 38 for most of its length and an enlarged diameter annular wall portion 39 at its second end, that is, the end opposite the end where valve seat 36 is located. Piston 34 is slidably supported in a multi-stepped bore 40 defined by valve body 10. A seal ring 42 carried in a groove 43 formed in piston 34 minimizes fluid leakage between piston 34 and valve body bore 40.

Valve seat 36 is annular and is mounted in the right end of valve body bore 40 (as viewed in FIG. 2). The rightmost end 34a of piston 34 defines a seat engaging surface and an effective pressure area A1 (the difference in radii) that is exposed to fluid pressure in ports 30. Fluid pressure impinging on the area A1 establishes a force which urges piston 34 toward the left (as viewed in FIG. 1) and out of engagement with seat 36.

Countering this fluid force is a biasing spring 44 housed in a spring chamber 45 which acts between the end wall of an adjustment plug (or "screw") 46, which is threadedly received by valve body 10, and the distal edge 39a of annular wall portion 39 of piston 34, that is, the left end of piston 34.

A hex-shaped aperture 47 formed in plug 46 accepts an Allen wrench or other suitable adjusting implement for causing rotation of the plug. The axial position (relative to valve body 10 of adjustment plug 46 determines the spring preload on piston 34. A cap 48 is threadedly engaged with adjustment plug 46, and an O-ring seal 50 is located as the juncture of cap 48, hexagonal portion 20 and adjustment plug 46. Cap 48 locks in place the position of adjustment plug 46.

In accordance with this invention, a vent piston 80 is located within spring chamber 45, and has a solid cylindrical head 82 received within annular wall portion 39 of piston 34. An O-ring 84 and a GLYD-ring 86 combine to provide a sliding hydraulic seal between vent piston 80 and the inside of wall 39 of tubular piston 34. Thus, vent piston 80 hydraulically divides valve-body bore 40 into an oil-filled hydraulic chamber (to the right) and a chamber (spring chamber 45) which is vented to the atmosphere. Cap 48 includes a filter 87 which vents spring chamber 45 to the atmosphere, while minimizing the ingress of dirt of various kinds.

Vent piston 80 also has a solid elongated portion 88 which extends from head 82, in a leftward direction as viewed in FIG. 2, to a distal end 90 in abutting engagement with the end wall of adjustment plug 46. Such abutment, together with the abutment of head 82 of vent piston 80 with an internal shoulder 92 of tubular piston 34 at the end of enlarged annular wall portion 39 thereof, set the end point of axial movement of tubular piston 34. Elongated portion 88 extends through coil spring 44 along the full length thereof, and coil spring 44 and elongated portion 88 are both within adjustment plug 46.

The configuration of head 82 and annular wall 39, and the location of the annular hydraulic seal therebetween, allow piston 34 to be hydraulically balanced. More specifically, such annular seal has a diameter equal to the diameter of the location of annular engagement between piston 34 and valve seat 36.

When the fluid force acting on the area A1 of piston 34 exceeds the force applied by spring 44, piston 34 will move to the left away from seat 36 and allow fluid flow from ports 30 into piston bore 38. A plurality of radial ports 54, spaced from the right end of piston 34 and in substantial alignment with valve body ports 32 provide a flow path for fluid from piston bore 38 to flow passage 14 in housing 12. Thus, whenever piston 34 moves away from seat 36, fluid flow from ports 30 to ports 32 can occur. As soon as the pressure at port 30 is reduced so that the fluid force developed on the area A1 is less than the spring force, piston 34 will move to the right and re-engage valve seat 36 and seal off fluid communication between ports 30,32. Leftward movement of piston 34 is limited as earlier described.

Valve seat 36 provides a check valve function and allow unimpeded fluid flow from ports 32 to ports 30. As seen in FIG. 2, seat 36 is slidably mounted in valve body bore 40 and is urged toward the left into engagement with piston 34 by a coil spring 56. Coil, spring 56 acts between a shoulder 36a formed in seat 36 and a spring seat 58 which is held in valve-body bore 40 by a retaining ring 60. Retaining ring 60 co-engages grooves formed in valve body bore 40 and retainer 58.

As can be seen in the drawing, fluid pressure at ports 30 also impinges on an end surface 36b of seat 36, establishing a force urging seat 36 toward the left. Whenever fluid under pressure is present at ports 30, a force is developed on seat 36 which urges the seat into engagement with piston 34.

As long as the pressure of the fluid in ports 30 is below the relief setting of the valve, the piston will sealingly engage seat 36 and prevent fluid communication from ports 30 to ports 32. Should the pressure of fluid at ports 32 be greater than at ports 30 the fluid force developed on an internal surface 36c of seat 36 will move seat 36 to the right until the shoulder 36a abuts spring retainer 58. As long as such displacement of seat 36 to the right continues fluid flow can proceed from ports 32 to ports 30.

Because spring 56 is minimally sized, very little fluid pressure is needed to effect movement in valve seat 36. Thus, the valve seat construction and mounting allows it to serve as a check valve allowing substantially unimpeded fluid flow from ports 32 to ports 30.

Valve body 10 has a single radial pilot port 76 formed therein at an axial position to the left of radial ports 32. Pilot port 76 communicates pilot pressure from a pilot passage 77 formed in housing 12 (see FIG. 1) to piston 34. Tubular piston 34 has an external annular shoulder 62 thereon in axial position adjacent to pilot port 76. Fluid pressure applied on annular shoulder 62 of piston 34 urges piston 34 toward the left as viewed in FIG. 2.

The pilot force is, of course, in opposition to the spring force. Because the area A2 of external shoulder 62, to which pilot pressure is applied, is substantially larger than the aforementioned area A1 on the tubular piston, relatively small pilot pressures can produce substantial forces. Thus, a relatively small pilot pressure will be enough to overcome the spring force and cause movement of piston 34.

In actual operation, piston 34 will be opened by the combination of forces developed on the areas A1 and A2. In short, piston 34 will move to the left whenever the sum of the forces on the areas A1 and A2 exceeds the force applied by biasing spring 44. In essence, the force applied by pilot pressure reduces the effective relief setting of the valve thereby causing movement in piston 34 and the establishment of fluid communication between ports 30 and ports 32.

The valve of this invention has a number of possible applications. One is for controlling the movement in boom actuators. In this application, the valve is used to lock the actuator in any position once fluid flow is terminated, and further, to prevent boom "runaway" whenever the boom is being lowered. When the boom is being raised, pressurized fluid is directed to ports 32 and, as discussed above, can flow unimpeded to ports 30 from where it then enters the appropriate actuator chamber (not shown) to cause boom elevation. When the fluid flow is terminated, seat 36 will immediately re-engage piston 34 and will prevent fluid flow from ports 30 to ports 32 and hence will prevent return flow from the actuator (not shown).

The fluid in the actuator will apply a force to the area A1 of the tubular piston but as long as it remains below the relief setting will not effect movement in the piston. The relief setting of the valve is generally selected to be higher than the pressure generated by the normally expected boom load. Only an abnormally high boom load will cause movement in the piston. In order to lower the boom, pilot pressure is applied to the pilot piston via the pilot passage 76. The piston will open as soon as the force applied to external shoulder 62 of piston 34 in combination with the force applied to the area A1 exceeds the spring force. This allows return flow of fluid from the actuator through the flow path established by ports 30, piston bore 38 and ports 32. Terminating the pilot pressure will immediately cause the piston 34 to re-engage valve seat 36 and prevent further fluid flow from the actuator and thus lock the boom assembly in a new position.

In the present invention, the absence of backpressure by virtue of the isolation and venting of spring chamber 45 makes the valve very quickly respond to system pressures. Furthermore, this feature allows adjustment of the relief threshold to be carried out with much improved accuracy because the valve main piston is insensitive to valve port pressure. Significantly, these characteristics are provided in a valve having short length. Such compactness allows use of the valve of this invention in small locations accommodating valves not having the advantages mentioned above.

Suitable materials and assembly methods would be apparent to those skilled in the art who are familiar with this invention.

While the principles of this invention have been described in connection with specific embodiments, it should be understood clearly that these descriptions are made only by way of example and are not intended to limit the scope of the invention.

I claim:

1. In a pilot-assisted pressure relief valve of the type having: a valve body with an axial bore, first and second axially-spaced radial ports, and a pilot port; a valve seat at one end thereof; a tubular piston in the valve body slidable with respect to the valve seat to control fluid flow from the first radial port into the piston, the piston having a first end engagable with the valve seat, an opposite second end, an effective pressure area at the first end exposed to pressure at the first radial port which urges the piston away from the valve seat, a piston port adjacent to the second radial port, and an external shoulder adjacent to the pilot port such that pilot pressure urges the piston away from the valve seat; and a spring extending between the valve body and the piston second end to urge the piston toward engagement with the valve seat, the improvement comprising:

the tubular piston having an annular wall which forms an axial opening at the second end of the tubular piston; a vent piston having a head slidably received within and engaged with the annular wall;

hydraulic seal means between the head and the annular wall thereby dividing the valve body interior into a hydraulic fluid chamber and an air-containing spring chamber; means venting the spring chamber to atmosphere; and said hydraulic seal means being an annular seal having a diameter placing it at a radial location equal to the radial location of engagement between the tubular piston and the valve seat thereby hydraulically balancing the tubular piston, whereby back pressure is eliminated entirely for both faster reaction to pressure impulses and improved accuracy in pre-load setting in a compact valve assembly.

2. The pilot-assisted pressure relief valve of claim 1 wherein the spring is a coil spring and the vent piston has an elongated portion received within the coil spring.

3. The pilot-assisted pressure relief valve of claim 1 wherein:

the tubular piston and its annular wall terminate in a distal edge of the annular wall;

the spring is a coil spring engaged at one end with the distal edge; and the vent piston has an elongated portion extending from the head away from the tubular piston, said coil spring extending around the elongated portion.

4. The pilot-assisted pressure relief valve of claim 3 further comprising:

an annular adjustment screw threadedly engaged within the valve body and receiving the other end of the coil spring and the elongated portion of the vent piston, the annular adjustment screw having an end wall; and the elongated portion of the vent piston terminating in a distal end which engages the end wall, thereby setting an end point of axial movement of the tubular piston and setting the range of possible pressure settings.

5. The pilot-assisted pressure relief valve of claim 4 wherein said venting means is an end cap engaged attached to the annular adjustment screw, said end cap having a filter vent.

6. The pilot-assisted pressure relief valve of claim 5 wherein the valve seat is spring biased toward engagement with the tubular piston first end and fluid-depressible away from such engagement, whereby it may function as a check valve.

7. The pilot-assisted pressure relief valve of claim 1 wherein said venting means is an end cap having a filter vent.

* * * * *